UNITED STATES PATENT OFFICE.

ADOLF HUGENDUBEL, OF STUTTGART-FEUERBACH, GERMANY, ASSIGNOR TO THE FIRM OF CARL FEUERLEIN, OF STUTTGART-FEUERBACH, GERMANY

PROCESS OF DECOLORIZING TANNIN EXTRACTS.

No. 904,483.  Specification of Letters Patent.  Patented Nov. 17, 1908.

Application filed December 17, 1907. Serial No. 406,899.

*To all whom it may concern:*

Be it known that I, ADOLF HUGENDUBEL, a citizen of the German Empire, residing at Stuttgart - Feuerbach, in the Kingdom of Würtemberg, Empire of Germany, have invented certain new and useful Improvements in Processes of Decolorizing Tannin Extracts; and I do hereby declare the following to be a full, clear, and exact description of the invention, such as will enable others skilled in the art to which it appertains to make and use the same.

A hitherto generally employed process of decolorizing tannin extract consists in adding sodium sulfite ($Na_2SO_3$) and sodium bisulfite ($NaHSO_3$) to the tannin extract. In spite, however, of the adding of large quantities or sulfite the decolorizing effect is only small and is successful only with light colored extracts, while it is ineffective with the very red colored mangrove extract.

Now by the process herein set forth the decolorizing, which is obtained by means of chromous compounds, the reducing properties of which Mathieu Villon first utilized technically in U. S. Patent No. 608,652, dated August 9th, 1898, is permanent and complete and is successful with very red colored mangrove extract.

The chromous compounds (see O. Dammer, *Handbook of Inorganic Chemistry*, Vol. 3, pages 526, 536, 546 and 567) are derived from chromous protoxid ($CrO$) and are characterized by a strong reducing power, so that even a very small addition of this substance to tannin extract, for instance, mangrove extract, suffices for obtaining a complete and permanent decolorization. For the attainment of the object in hand, the chromous salts of the weak acids, such as chromous acetate ($Cr(CH_3CO_2)_2$) or chromous sulfite ($CrSO_3$), are the most suitable, but chromous chlorid ($CrCl_2$) and chromous sulfate ($CrSO_4$) may also be employed. The process also has the great advantage that no loss of tannin takes place, as numerous analyses have shown.

Examples.

*I. Decolorizing of mangrove extract.*—To 1000 kilograms of mangrove extract of 25° Baumé, 5–7.5 kilograms of chromous acetate are added, under agitation, in the form of a paste. The decolorizing takes place even when cold, but is preferably assisted by heating to about 70° C.

*II. Decolorizing of quebracho extract.*—1000 kilograms of quebracho extract of 25° Baumé are, as in Example I, treated with 1–2 kilograms of chromous acetate, or the thin chromous acetate paste is introduced into the vacuum evaporator.

Having thus fully described my invention, what I claim is:

The process of decolorizing tannin extracts which consists in treating the same with chromous compounds derived from chromous protoxid ($CrO$).

In testimony whereof I affix my signature, in presence of two witnesses.

ADOLF HUGENDUBEL.

Witnesses:
 JEAN GULDEN,
 HERM. HOPPE.